Patented Aug. 21, 1934

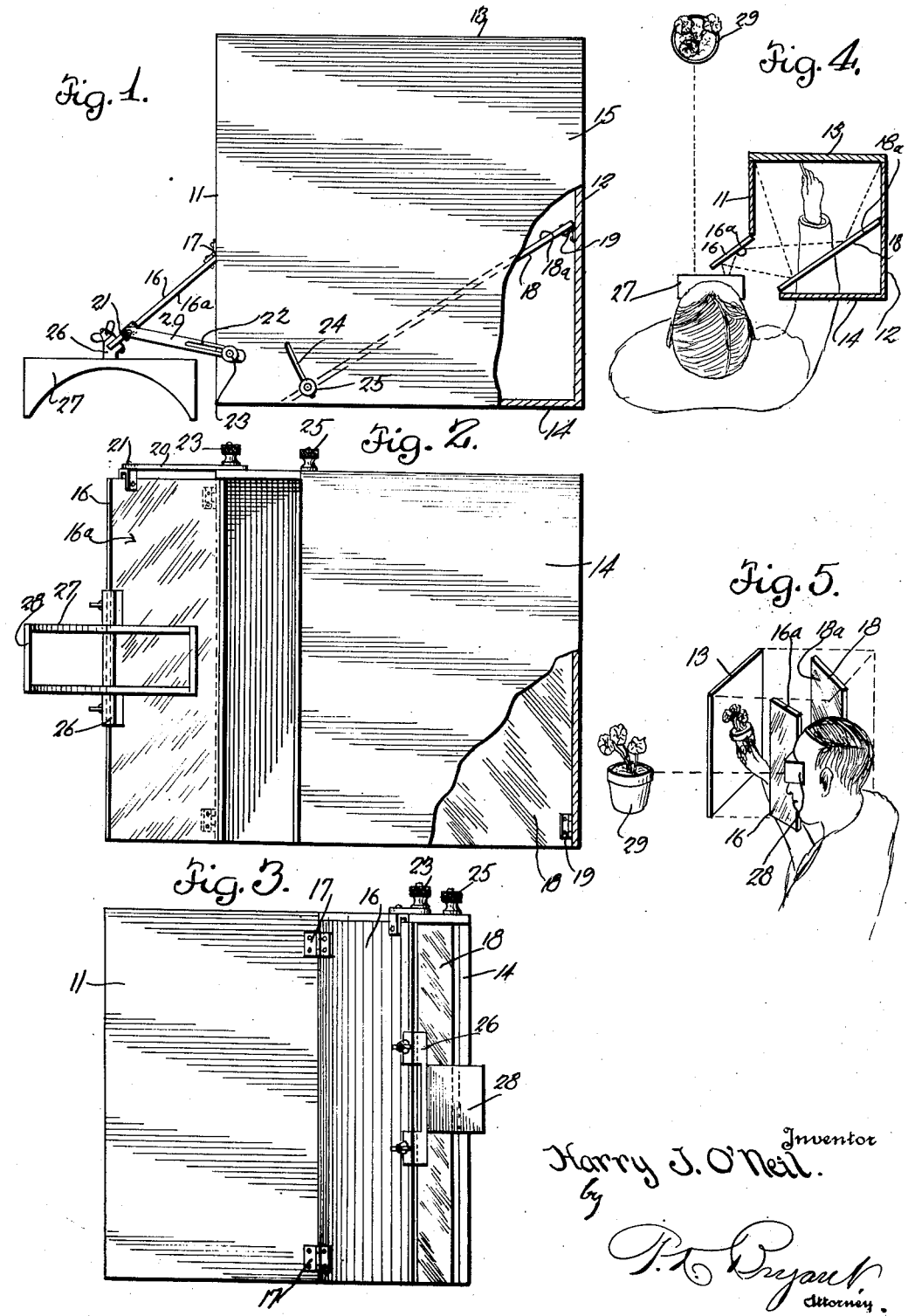

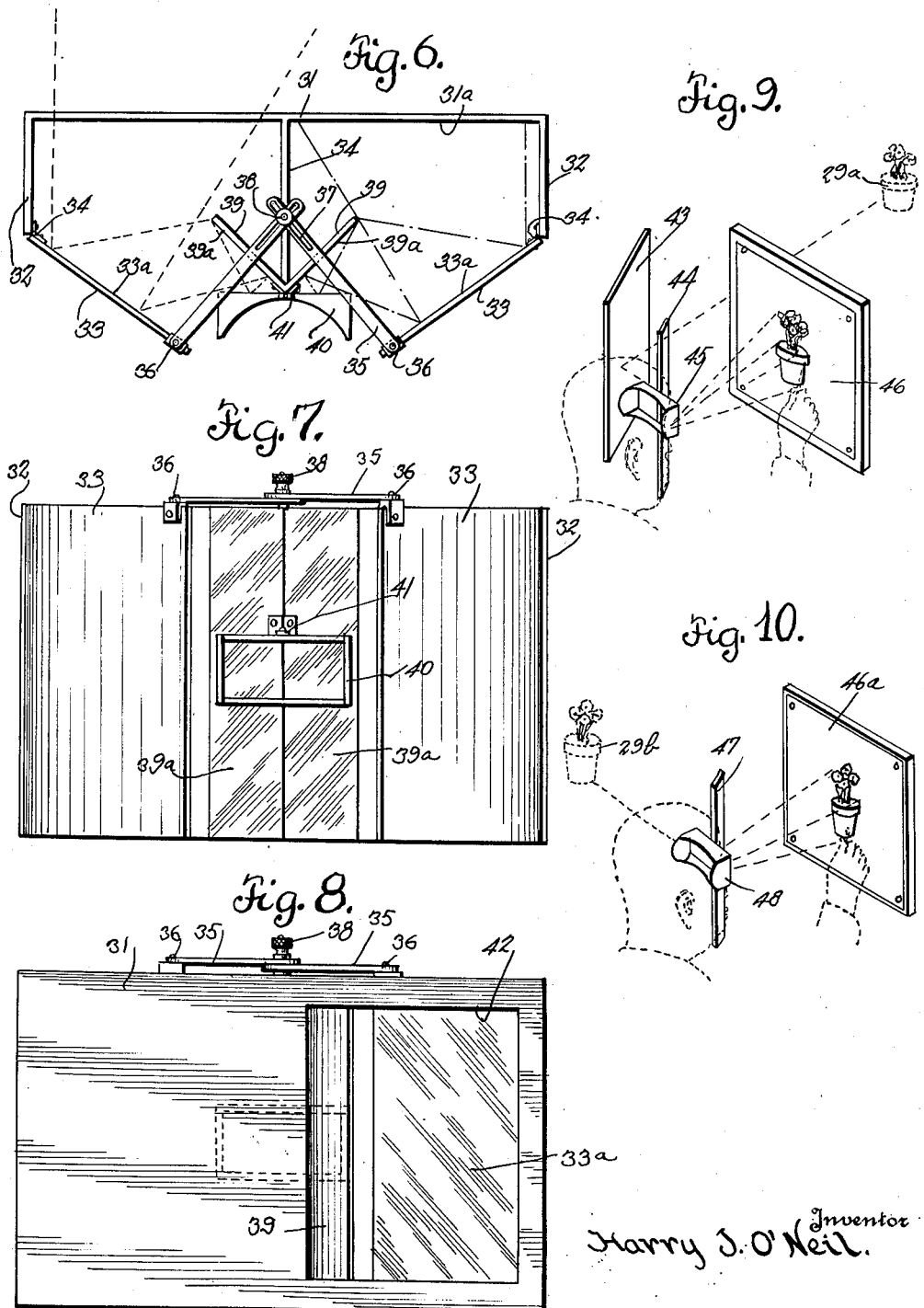

1,971,119

UNITED STATES PATENT OFFICE 1,971,119

FREE HAND SKETCHING APPARATUS

Harry J. O'Neil, Buffalo, N. Y.

Application August 1, 1931, Serial No. 554,587

2 Claims. (Cl. 88—1)

This invention relates to certain new and useful improvements in free hand sketching apparatus.

The invention relates to free hand sketching apparatus of the character wherein an object viewed by one eye of a person with the vision of the other eye of the object obscured so that an image or apparition of the object in the brain of the person is seen by the object obscured eye vision on a drawing board or the like to be accurately sketched.

It is a further object of the invention to provide a system of mirrors whereby the image or apparition is enlarged and spaced a greater distance from the eye to facilitate sketching thereof.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view, partly broken away and shown in section of a free hand sketching apparatus constructed in accordance with the present invention, showing the casing structure carrying the drawing board, the adjustable mirrors and the head support;

Figure 2 is a side elevational view, partly broken away and shown in section and illustrating the head rest attached to one of the reflecting mirrors;

Figure 3 is another side elevational view showing the hinge mounting for the mirrors carrying the head support;

Figure 4 is a horizontal sectional view with a person in position, sketching an object;

Figure 5 is a diagrammatic perspective view showing the arrangement of the angularly disposed reflecting mirrors and drawing board with the casing illustrated by dotted lines;

Figure 6 is a top plan view of another form of frame structure and mirror arrangement;

Figure 7 is a rear elevational view of the device shown in Figure 6 showing a V-shaped mirror frame upon which the head rest is mounted;

Figure 8 is a front elevational view of the device shown in Figures 6 and 7;

Figure 9 is a diagrammatic perspective view showing a pair of angularly disposed mirrors and a drawing board with the head rest associated with one of the mirrors so that the object to be sketched can be drawn upon the board;

Figure 10 is a diagrammatic perspective view showing a single mirror and drawing board with the image apparition appearing in the brain in reversed position.

To explain the principle of operation of the free hand sketching apparatus, it has been found by experiment that if one eye of a person has the vision thereof obscured by a card or pad and the other eye has clear vision of an object, an image or apparition of the object in the brain of the person may be seen on the card or pad and a sketch of the object accurately drawn. By this experiment, the drawing produced was quite small and by the introduction of mirrors as hereinafter described in detail, the mirror constitutes the vision obstruction and the drawing board may be placed a greater distance for the head of the person with the image or apparition appearing in an enlarged condition whereby reproduction, as by drawing or sketching is facilitated.

Referring more in detail to the accompanying drawings and particularly to Figures 1 to 5, there is illustrated a free hand sketching apparatus comprising a box-like casing comprising side walls 11 and 12, and front and rear walls 13 and 14, the casing including a cover wall 15 and preferably being open at its bottom as illustrated in Figure 2. Adjacent edges of the walls 11 and 14 are cut away to provide a corner opening in the casing and a plate mirror 16 is hinged as at 17 to the cut away edge of the wall 11 with the reflecting side 16a of the mirror facing the casing. Another mirror 18 is hinged as at 19 to the inner side of the wall 12 substantially midway the ends thereof and is of a length to have its free end terminate adjacent the cut away edge of the wall 14, the reflecting face 18a of the mirror 18 being directed toward the wall 13.

The mirrors 16 and 18 are angularly adjustable, the mirror 16 having one end of a link 20 pivotally attached thereto as at 21 adjacent its free swinging edge while the other slotted end 22 of the link 20 works in conjunction with a set screw 23 threaded into the top wall 15 of the casing. The adjusting device for the mirror 18 includes the provision of an arcuate slot 24 in the top wall 15 of the casing and through which slot a set screw 25 carried by the upper edge of the mirror 18 adjacent its free swinging edge extends.

A head rest is carried by the free edge of the mirror 16 and includes a bracket 26 clampingly engaged with the free edge of the mirror 16 substantially midway the upper and lower edges thereof, the bracket carrying a rectangular frame comprising upper and lower inwardly arched walls 27 connected by end walls 28.

In the use of the apparatus, and as illustrated in Figures 4 and 5, the object 29 to be sketched is placed outwardly of the wall 13 of the casing and in line with the left side of the head rest, the image or apparition of the object that is enlarged by the angularly disposed mirrors 16 and 18 may, with accuracy be drawn on the wall 13 when the head of a person is engaged with the head rest. In this form of the invention, the object 29 is directly viewed by the person with one eye and by the system of mirrors, the image or apparition is enlarged and is more easily sketched. The mirrors 16 and 18 are angularly adjustable to move the apparition farther from the eye and for lateral placement. The use of the apparatus is schematically illustrated in Figures 4 and 5. If desired, the casing may be mounted upon a tripod or other stand and objects of various characters may be easily sketched or drawn.

In the form of the invention shown in Figs. 6 to 8, the device comprises a frame structure including a rectangular front wall 31 and end walls 32, a plate mirror 33 being hinged as at 34 to the free edge of each end wall 32. A central partition wall 34 projects from the front wall 31 between the end walls 32 and plate mirrors 33, each mirror having a link 35 pivotally attached at one end as at 36 to its free edge, the other end of the link 35 being slotted as at 37 for the passage of the thumb screw 38 that enters the upper edge of the partition 34. A V-shaped mirror 39 is engaged with the free edge of the partition 34, being suitably secured thereto and a head frame 40 of the type illustrated in Figures 1 to 5 is secured as at 41 to the V-shaped mirror. One side of the front wall 31 of the frame is provided with a relatively large opening 42 as shown in Figure 8 to permit viewing of an object through the frame. The mirror faces 33a and 39a are opposed to each other and the mirrors are angularly adjustable as described.

In Figure 9, a pair of angularly disposed mirrors 43 and 44 is provided, the head rest 45 being carried by the mirror 44 while the reference numeral 46 designates a drawing board. The object 29a is reflected in the mirror 43 and then into the mirror 44, and the apparition appearing in the brain of the person may be drawn upon the board 46.

In the form of the invention illustrated in Figure 10, a single angularly disposed mirror 47 is provided and the head rest 48 is carried thereby, the object 29b being first reflected in the mirror 47 and then with the aid of the eyes of the person, the apparition is drawn upon the drawing board 46a in reversed position, but by the use of a pair of angularly disposed mirrors as illustrated in Figure 9, the reverse positioning is corrected and the image or apparition is in true form.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. In a free hand sketching apparatus, a frame casing comprising a front wall and end walls, a cross partition between the end walls, the front wall at one side of the partition having an opening therein occupying the major area thereof, a mirror hinged to each end wall, respectively opposite the closed and open portions of the front wall, a V-shaped mirror carried by the partition wall and arranged in reflective relation to the hinged mirrors and a head rest carried by the V-shaped mirror.

2. In a free hand sketching apparatus, a frame casing comprising a front wall and end walls, a cross partition between the end walls, the front wall at one side of the partition having an opening therein occupying the major area thereof, a mirror hinged to each end wall, respectively opposite the closed and open portions of the front wall, a V-shaped mirror carried by the partition wall and arranged in reflective relation to the hinged mirrors, a head rest carried by the V-shaped mirror, and adjustable link rod connections between the hinged mirrors and the partition wall.

HARRY J. O'NEIL.